United States Patent
Gorski et al.

(10) Patent No.: US 12,117,348 B2
(45) Date of Patent: Oct. 15, 2024

(54) HOUSING ELEMENT FOR SECURING AT LEAST ONE TEMPERATURE SENSOR ON A MEASURING OBJECT

(71) Applicant: TE Connectivity Germany GmbH, Bensheim (DE)

(72) Inventors: Katharina Gorski, Speyer (DE); Sebastian Wiechert, Speyer (DE)

(73) Assignee: TE Connectivity Germany GmbH, Bensheim (DE)

( * ) Notice: Subject to any disclaimer, the term of this patent is extended or adjusted under 35 U.S.C. 154(b) by 194 days.

(21) Appl. No.: 17/036,599

(22) Filed: Sep. 29, 2020

(65) Prior Publication Data

US 2021/0190599 A1 Jun. 24, 2021

(30) Foreign Application Priority Data

Dec. 18, 2019 (EP) ...................................... 19217288

(51) Int. Cl.
*G01K 1/12* (2006.01)

(52) U.S. Cl.
CPC ..................................... *G01K 1/12* (2013.01)

(58) Field of Classification Search
CPC ............................... G01K 1/12; G01K 15/005
See application file for complete search history.

(56) References Cited

U.S. PATENT DOCUMENTS

| | | | |
|---|---|---|---|
| 4,358,953 A | 11/1982 | Horiuchi et al. | |
| 5,062,432 A | 11/1991 | James et al. | |
| 5,999,081 A | 12/1999 | Hannigan et al. | |
| 6,193,411 B1 | 2/2001 | Chen | |
| 8,851,744 B1 | 10/2014 | Feller | |
| 2007/0206653 A1* | 9/2007 | Nakano | G01K 15/005 374/1 |
| 2008/0013591 A1* | 1/2008 | Kim | G01K 15/002 374/1 |
| 2010/0103975 A1* | 4/2010 | Harslund | G01K 15/00 374/1 |
| 2019/0360876 A1* | 11/2019 | Korn | G01K 15/00 |
| 2020/0064208 A1* | 2/2020 | Schalles | G01K 7/02 |
| 2021/0123822 A1* | 4/2021 | Maunumäki | G01R 22/061 |
| 2021/0247245 A1* | 8/2021 | Schalles | G01K 1/12 |

FOREIGN PATENT DOCUMENTS

| | | | | |
|---|---|---|---|---|
| CN | 102177425 B | * | 7/2014 | ............. G01K 15/00 |
| CN | 107884097 A | * | 4/2018 | ........... G01K 15/002 |
| DE | 102017115491 B3 | * | 11/2018 | ........... G01K 15/002 |
| EP | 1190228 A0 | | 3/2002 | |
| EP | 2350588 A0 | | 8/2011 | |
| FR | 2505049 A1 | * | 11/1982 | |

(Continued)

OTHER PUBLICATIONS

Translation of WO2013113683A2 (Year: 2013).*

(Continued)

*Primary Examiner* — Mirellys Jagan
(74) *Attorney, Agent, or Firm* — Barley Snyder

(57) ABSTRACT

A housing element for securing a temperature sensor on a measuring object includes a filling and a sheath surrounding at least a portion of the filling. The filling forming a sensor cavity housing the temperature sensor and an insertion channel receiving the measuring object.

11 Claims, 1 Drawing Sheet

(56) References Cited

FOREIGN PATENT DOCUMENTS

JP          2017026521 A      2/2017
WO     WO-2013113683 A2 *   8/2013   ........... G01K 15/002

OTHER PUBLICATIONS

Translation of DE102017115491B3 (Year: 2018).*
Translation of FR 2505049A1—1982.*
Extended European Search Report, European Application No., 19217288.0-1001, European Filing Date, Jun. 8, 2020.
Examination Report dated Sep. 21, 2023, corresponding to Application No. 19 217 288.0-1001, 25 pages.

* cited by examiner

HOUSING ELEMENT FOR SECURING AT LEAST ONE TEMPERATURE SENSOR ON A MEASURING OBJECT

CROSS-REFERENCE TO RELATED APPLICATION

This application claims the benefit of the filing date under 35 U.S.C. § 119(a)-(d) of European Patent Application No. 19217288.0, filed on Dec. 18, 2019.

FIELD OF THE INVENTION

The present invention relates to a housing element and, more particularly, to a housing element for securing at least one temperature sensor on a measuring object.

BACKGROUND

In the operation of a temperature sensor, it is desired to keep the sensor in close physical contact with the measuring object. This contact should not be impaired by vibrations or other disturbances. When the position of a temperature sensor and/or the heat transfer between the temperature sensor and the measured object is impaired, the measuring object may overheat without being noticed. In the worst case, failure of the object may occur.

SUMMARY

A housing element for securing a temperature sensor on a measuring object includes a filling and a sheath surrounding at least a portion of the filling. The filling forming a sensor cavity housing the temperature sensor and an insertion channel receiving the measuring object.

BRIEF DESCRIPTION OF THE DRAWINGS

The invention will now be described by way of example with reference to the accompanying Figures, of which.

DETAILED DESCRIPTION OF THE EMBODIMENT(S)

In the following, the invention and its improvements are described in greater detail using exemplary embodiments and with reference to the drawings. The various features shown in the embodiments may be used independently of each other in specific applications. In the figures, elements having the same function and/or the same structure will be referenced by the same reference signs.

Figure 1:
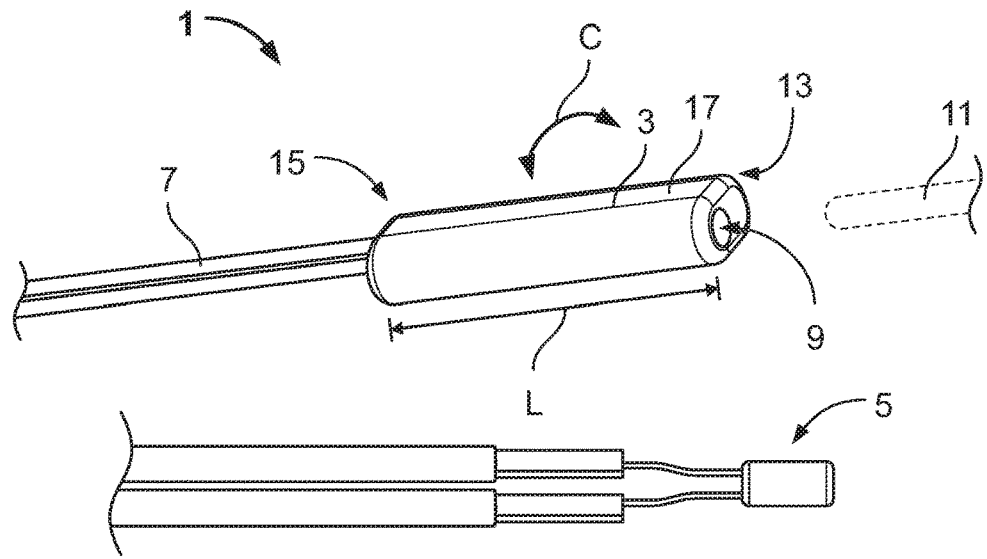
FIG. 1 is a perspective view of an arrangement according to an embodiment and a temperature sensor.

An arrangement 1 according to an embodiment, as shown in FIG. 1, comprises a housing element 3 and a temperature sensor 5. The temperature sensor 5 without the housing element 3 is also shown below the arrangement 1 in FIG. 1. The temperature sensor 5 may be any appropriate temperature sensor, for example a NTC-sensor (Negative Temperature Coefficient) or another resistive element, such as a Platinum sensor (e.g. Pt100 or Pt1000) or a thermocouple utilizing the thermoelectric effect.

The housing element 3, as shown in FIG. 1, has an overall longitudinal shape and extends along a longitudinal direction L. The temperature sensor 5 is embedded in the housing element 3, in particular in a sensor cavity. Electric conductors 7 extend basically parallel with the longitudinal direction away from the housing element 3 in order to establish an electrical contact with the temperature sensor 5. The housing element 3 may serve as a securing element for the temperature sensor 5.

The housing element 3 is provided with an insertion channel 9 for receiving a measuring object 11 at least in parts, as shown in FIG. 1. In an embodiment, the measuring object 11 is a part of an electric drive. However, the housing element 3 may also be used for other purposes. The measuring object 11 may in particular be a temperature lance that is adapted for transferring heat from a heat source of the object to the temperature sensor 5 inside the housing element 3.

The insertion channel 9 has an overall longitudinal, in particular cylindrical, shape. The insertion channel 9 opens up to an object end 13 of the housing element 3, whereas the temperature sensor 5 is accessible via its electric conductors 7 from a sensor end 15. The object end 13 and the sensor end 15 are arranged opposite each other along the longitudinal direction L. The insertion channel 9 may be formed as a shaft, tunnel or a blind hole, having a constant inner diameter and being closed at one end. In another embodiment, the insertion channel 9 may have a non-constant inner diameter and/or may be formed as a through-hole.

In an embodiment, the sensor cavity 23 and the at least one insertion channel 9 open up to opposite sides 13, 15 of the housing element 3. Thereby, the cable routing for the temperature sensor 5 may be improved because cables may be guided away from the measuring object 11, without colliding with the measuring object 11.

The housing element 3 is composed of a filling and a sheath 17, shown in FIG. 1, that surrounds the filling at least in parts. At least the sensor cavity and the insertion channel 9 are accessible through the sheath 17. The sheath 17 surrounds the filling along a circumferential direction C, which extends around the longitudinal direction L. In an embodiment, the sheath 17 extends continuously along the circumferential direction C. The sheath 17 may have an overall tube shape.

The arrangement 1 can be manufactured according to customer requirements, in particular with respect to the insertion channel 9. In an embodiment, the insertion channel 9 is shaped complementary to the measuring object 11 for which the housing element 3 is intended to be used. At a customer's site, the arrangement 1 can be securely connected to the measuring object 11 by simply plugging the object 11 into the insertion channel 9. The housing element 3 allows for a stable physical contact between the temperature sensor 3 and the measuring object 11.

Figure 2:
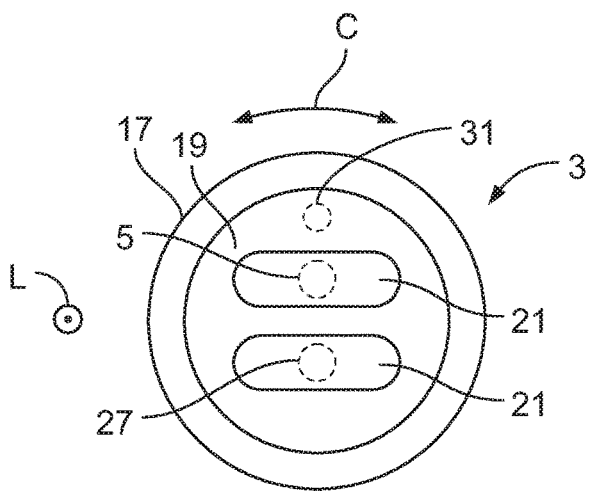
FIG. 2 is a schematic end view of the arrangement prior to shaping.

In the following, further details of the housing element 3 and of manufacturing the same are described with respect to FIGS. 2 and 3. FIG. 2 shows a material for the housing element 3 prior to shaping and FIG. 3 after shaping. FIG. 2 shows a cross-sectional view in a cross section perpendicular to the longitudinal direction.

Figure 3:
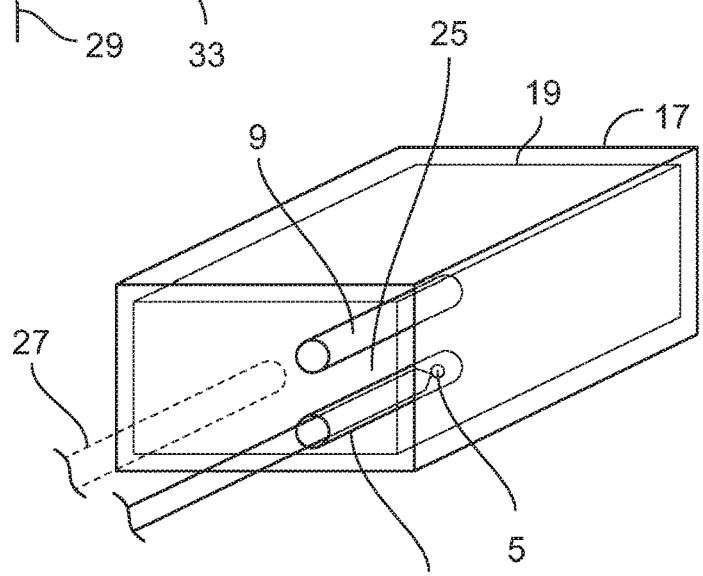
FIG. 3 is a schematic perspective view of the arrangement after shaping.

As shown in FIGS. 2 and 3, the housing element 3 is composed of a filling 19 and a sheath 17. In an embodiment, the sheath 17 is in direct contact with the filling 19, in particular after shaping the housing element 3. Prior to shaping, two cavities 21 may be present in the filling 19 which will later be shaped to form the insertion channel 9 and a sensor cavity 23 for housing the temperature sensor 5.

In the shaped state, the filling 19 forms a material bridge 25 between the insertion channel 9 and the sensor cavity 23, as shown in FIG. 3. When the temperature sensor 5 and the measuring object 11 are arranged in the housing element 3 with a tight fit in their corresponding cavities, the material bridge 25 is intended to transfer heat from the measuring object 11 to the temperature sensor 5.

The system comprising the filling 19 and the sheath 17 may also be regarded as a multitude of layers, the filling 19 forming an inner layer that may be in contact with the temperature sensor 5 and the measuring object 11 and the sheath 17 forming an outer layer that is on top of the inner layer. The invention does not exclude the presence of additional layers that are arranged between the filling 19 and the sheath 17, on the outside of the sheath 17 and/or surrounding the sensor cavity 23 and/or the insertion channel 9. In order to securely confine the filling 19 and to improve the stability of the housing element 3, the sheath 17 in an embodiment extends continuously along a circumferential direction of the housing element 3.

The filling 19, in an embodiment, is made from a fluoropolymer material, for example Perfluoroalkoxy alkanes (PFA). This material may be helpful for removing a placeholder 27 after shaping the housing element 3 due to its non-sticking properties. Using a fluoropolymer material is beneficial because of its dielectric properties, in particular when the housing element 3 is used in high voltage applications. A placeholder 27 is indicated by the dashed line in FIG. 3. The filling 19 material may be chosen and/or designed with specific thermal conductivities depending on individual applications.

In an embodiment, the sheath 17 is made from a fluoropolymer material, for example Polytetrafluoroethylene (PTFE). The sheath 17 may be made from a heat shrinkable material. In an embodiment, the sheath 17 is made from a heat shrinkable fluoropolymer material.

For manufacturing the arrangement 1, a temperature sensor 5 may be placed inside one of the cavities 21 and a placeholder 27 may be arranged in the other cavity 21. The placeholder 27 is provided with the same diameter as the measurement object 11 for which the housing element 3 is intended to be used. The material of the filling 19 and the sheath 17 may then be heated using a heating arrangement 29, which is only indicated by a hot wire 29 in FIG. 2. The heating arrangement 29 may comprise a heat gun or any other appropriate heater. The heating arrangement 29 and the placeholder 11 may together form a setup 33 according to the invention.

The heating arrangement 29 may heat the material of the housing element 3 such that the filling 19 increases its viscosity or, in other words, melts. At the same time, if the sheath 17 is made from a heat shrinkable material, the sheath 17 shrinks and applies pressure on the material of the filling 19 towards the temperature sensor 5 and the placeholder 27. Thereby, the sensor cavity 23 is shaped complementary to the temperature sensor 5 and the insertion channel 9 is formed complementary to the placeholder 27. The sheath 17 may facilitate the manufacturing process of the housing element 3 in that it may confine the filling 19, in particular when the filling 19 is in a state of viscosity during manufacturing.

The placeholder 27 may, after shaping the insertion channel 9, be removed from the housing element 3 by simply pulling it out of the insertion channel 9. The placeholder 27 may then be used for shaping the insertion channel 9 of another housing element 3 at a later stage. If the actual measuring object 11 is used as the placeholder 27, the measuring object 11 may remain in the housing element 3.

The housing element 3 with the temperature sensor 5 in the sensor cavity 23 may be installed on the measuring object 11 by inserting a part of the measuring object 11 into the insertion channel 9. Since the insertion channel 9 is formed complementary to the measuring object 11, the measuring object 11 will fit tightly into the insertion channel 9 with a direct contact to the filling 19 and thereby to the material bridge 25. The insertion channel 9 has an inner diameter that is basically identical to an outer diameter of the measuring object 11. At the same time, due to the complementary shapes of the insertion channel 9 and the measuring object 11, the housing element 3 is securely fixated on the measuring object 11.

If this fixation should not be sufficient, additional elements 31 such as fixation elements may be embedded in the filling 19, as shown in FIG. 2. An additional element 31 may be arranged in the filling 19 prior to shaping and then remain in the filling 19 after manufacturing.

Just by way of example, an additional element 31 may be a latching device that may protrude out of the housing element 3 for latching the same with a complementarily shaped element of the measuring object 11. In other embodiments, an additional element 31 may be formed by a screw, a latch, a screw nut or other appropriate elements.

In other embodiments, the housing element 3 may be provided with more than one temperature sensor 5 and/or more than one measuring object 11 and the corresponding cavities 23 or insertion channels 9.

What is claimed is:

1. An arrangement, comprising:
   a housing element including a filling and a sheath surrounding at least a portion of the filling, the filling forming a sensor cavity and an insertion channel;
   a temperature sensor housed in the sensor cavity, the filling being a dielectric material that is heat transferring and is shapeable around the temperature sensor;
   a measuring object removably received in the insertion channel; and
   a placeholder having a same dimension as the measuring object, the placeholder is used to form the insertion channel in the filling of the housing element, and the insertion channel being formed complementary to the placeholder at least in parts.

2. The arrangement of claim 1, wherein the filling forms a material bridge between the sensor cavity and the insertion channel.

3. The arrangement of claim 1, wherein the sheath extends continuously along a circumferential direction of the housing element.

4. The arrangement of claim 1, wherein the filling is made from a fluoropolymer material.

5. The arrangement of claim 1, wherein the sheath is made from a fluoropolymer material.

6. The arrangement of claim 1, wherein the sensor cavity has an overall longitudinal shape.

7. The arrangement of claim 1, wherein the insertion channel has an overall longitudinal shape.

8. The arrangement of claim 1, wherein the sensor cavity and the insertion channel open up to opposite sides of the housing element.

9. The arrangement of claim 1, wherein the sheath is made from a heat shrinkable material.

10. The arrangement of claim 1, wherein an additional element is embedded in the filling.

11. The arrangement of claim 10, wherein the additional element is a fixation element.

\* \* \* \* \*